United States Patent [19]

Doemens et al.

[11] Patent Number: 4,941,363
[45] Date of Patent: Jul. 17, 1990

[54] SENSOR FOR MEASUREMENT OF THE TORQUE ACTING ON A ROTATING SHAFT

[75] Inventors: Guenter Doemens, Holzkirchen; Markus Gilch, Hoergertshausen, both of Fed. Rep. of Germany

[73] Assignee: Siemens Aktiengesellschaft, Berlin and Munich, Fed. Rep. of Germany

[21] Appl. No.: 385,815

[22] Filed: Jul. 26, 1989

[30] Foreign Application Priority Data

Aug. 11, 1988 [DE] Fed. Rep. of Germany ....... 3827301
May 24, 1989 [DE] Fed. Rep. of Germany ....... 3916959

[51] Int. Cl.⁵ .............................................. G01L 3/10
[52] U.S. Cl. ................................. 73/862.33; 361/290
[58] Field of Search ..................... 73/862.33; 361/280, 361/287, 290

[56] References Cited

U.S. PATENT DOCUMENTS 2,476,410  7/1949  Gardiner ........................... 73/862.33
3,487,402  12/1969  Hillhouse ......................... 73/862.33

FOREIGN PATENT DOCUMENTS 2217183  4/1972  Fed. Rep. of Germany .
0111028  6/1984  Japan ................................. 73/862.33
0830160  5/1981  U.S.S.R. ............................ 73/862.33
2195183  3/1988  United Kingdom .

OTHER PUBLICATIONS

"Ingenious Mechanics Digitally Interpreted: A Torque Monitor that can Think Ahead, ETC of Ringspann can also be Subsequently Built into Machines", Pyper, VDI-Nachrichten, No. 20, May 18, 1987.
Herstellung von Mikrostrukturen mit groBer Aspektverhaltnis und groBer Strukturhohe durch Rontgentiefenlithographie mit synchrotronstrahlung, Galvanoformung und Kunststoffabformung (LIGA-Verfahren), Becker et al., KFK Report 3995.

Primary Examiner—Donald O. Woodiel
Attorney, Agent, or Firm—Hill, Van Santen, Steadman & Simpson

[57] ABSTRACT

A sensor for measuring the torque acting on a rotating shaft has two electrode structures which are respectively mechanically coupled to two axially spaced points on the shaft to be measured so that a relative movement between the two electrode structures occurs due to the torque. The electrode structures each have a number of parallel, spaced electrodes and are asymmetrically mounted in a plane so that a number of capacitors are formed by electrode pairs each having an electrode from each electrode structure. Because of the asymmetrical arrangement, the electrodes in a pair are spaced a relatively large distance away from the next closest electrode, so that a capacitive decoupling between the pairs is achieved. Changes in the spacing between the points on the shaft due to torsion of the shaft caused by the torque will change the spacing between the electrodes in each pair, thereby resulting in a total capacitance change which is proportional to the torque. To compensate for the influence of transverse forces or bending moments acting on the shaft, a further capacitor arrangement identical to the first arrangement is arranged at an angle of 180° with respect to the first arrangement, with the capacitance used for the purpose of measurement being the capacitances of the two capacitor arrangements in the series.

36 Claims, 4 Drawing Sheets

SENSOR FOR MEASUREMENT OF THE TORQUE ACTING ON A ROTATING SHAFT

BACKGROUND OF THE INVENTION

1. Field of the Invention

The present invention is directed to a sensor for measuring the torque acting on a rotating shaft, and in particular to such a sensor including a capacitive transducer which measures a change in the distance or spacing between points on the shaft and converts the measurement into an electrical signal.

2. Description of the Prior Art

Precise, non-contacting measurement of the output torque, and thus of the mechanical power, of a rotating shaft is currently one of the most urgent sensor problems in energy and automation technology. A signal corresponding to the output torque is useful for monitoring and controlling drive systems, as well as for optimizing the efficiency of energy conversion systems.

Currently known methods for non-contacting measurement of torque make use either of the acquisition of a mechanical tension generated due to the moment occurring at the shaft surface, or measurement of the torsion.

It is known to apply wire strain gauges to the shaft for converting the mechanical tension into an electrical signal, with the measured signal being taken from the rotating shaft at a carrier frequency. This method has been predominately employed in the laboratory, because attachment of wire strain gauges to the shaft is relatively complicated, and the measuring transmission is very costly.

It is also known to mechanically couple an amorphous metal layer to the shaft to be measured, and to measure the change in the permeability of the amorphous metal layer which occurs due to mechanical tension, which is proportional to the torque acting on the shaft. This known method, however, requires some means for mechanically attaching the amorphous metal layers to the shaft.

The torsion of a shaft, for the usual range of shaft diameters and torques, is extremely slight. An electric motor shaft having a diameter of 70 millimeters, for example, experiences torsion at nominal torque values of only a few micrometers at a measuring distance of 30 millimeters. For intensifying the torsional path, a longer measuring shaft is usually connected to the end of the shaft to be measured, and the torsion is taken from the measuring shaft via inductive systems. This method, however, can usually not be applied "in the field" because there is usually no space available for the additional measuring shaft. A proposal has been made in the periodical VDI-Nachricten, No. 20, May 15, 1987 to make the torque measurable by measuring the torsion at the end of the shaft to be measured, by converting the torsional path on the shaft into an axial motion with a mechanical lever system. The axial displacement, which will be in the range of tenths of a millimeter, is then acquired in non-contacting fashion by an inductive system. The axial measuring interval on the shaft corresponds approximately to twice the shaft diameter. This method, however, requires a relatively complex mechanism, and the obtainable precision is about 5%, which is not sufficient for many applications.

A sensor for non-contacting measurement of the torque experienced by a rotating shaft is described in British specification 2 195 183, wherein measurement of the torsional path is made using a capacitive transducer. A capacitor arrangement having electrode structures which are arranged at a radial spacing relative to each other, and proceeding parallel to the shaft surface, is provided as a variable capacitance. A change in capacitance, corresponding to the torsion (the transmitted torque) is obtained by changes in the electrode surface. The electrode structures are comb-like and are arranged on the shaft surface and on a tube surrounding the shaft at a radial distance therefrom, with the tube being connected to the shaft at an axial distance from the capacitor arrangement. This axial distance corresponds to approximately 5 times the value of the shaft diameter, since the slight changes in capacitance which are involved require that the torsional path being measured be made relatively long.

SUMMARY OF THE INVENTION

It is an object of the present invention to provide a sensor for measuring the torque acting on a rotating shaft which occupies a relatively small axial space and which can undertake a measurement with a precision of less than 1% in non-contacting fashion, and which generates an output signal proportional to the torque.

The above object is achieved in accordance with the principles of the present invention in an apparatus which includes electrode structures mounted in a single plane forming a capacitor arrangement, the electrode structures being electrically insulated from each other and being moveable parallel to each other in the plane by the length or spacing change caused by torsion of the shaft which is to be measured. Each electrode structure includes a plurality of planar electrodes arranged parallel to and spaced from each other, and the electrode structures are arranged relative to each other in the plane asymmetrically so that the planar electrodes mesh to form electrode pairs, each electrode pair forming a capacitor. Due to the asymmetrical arrangement of the electrode structures, the electrodes forming an electrode pair are disposed much closer to each other than to the next, successive electrodes on either side of the pair. Due to this disparity in spacing, the change in capacitance which is measured as being proportional to the torque is the change in capacitance of the electrode pairs, with each pair being capacitively decoupled from the neighboring pairs.

Because of the capacitive decoupling, the total capacitance formed by the electrode structures is essentially the sum of the individual capacitances formed by the electrode pairs. The electrode structures are respectively mechanically coupled to spaced points on the shaft to be measured. When the shaft experiences a torque, the resulting torsion will cause a change $\Delta x$ in the spacing between the points, which causes the measured capacitance to change from an initial capacitance to a new capacitance C, according to the relationship:

$$C = \frac{n \cdot \epsilon_0 \cdot F1}{d1 \pm \Delta x}$$

wherein n is the number of electrodes of the electrode structures, F1 is the area of the overlapping regions of the electrodes of an electrode pair, d1 is the initial value of the spacing between the electrodes of an electrode pair, and $\epsilon_0$ is the dielectric constant of the material between the electrodes. It can be seen that the area F1 and the number n of the electrodes have a multipicative effect, and thus extremely high measuring precision can be achieved, particularly in a multiple arrangement (i.e., an arrangement having a large number of electrode pairs) with a very small spacing dl between the electrodes comprising each electrode pair.

In contrast to the structure of the aforementioned British specification 2 195 183, the change in capacitance in the structure disclosed herein is not achieved by a variation of the electrode area, but instead is achieved by a variation of the electrode spacing. This results, in the sensor being significantly more sensitive, i.e., large capacitance changes comparable in magnitude to those achieved in the prior art can be achieved in the structure disclosed herein with a significantly smaller change in the length or spacing between the measured points on the shaft. In the measurement of torque, this means that the structure disclosed herein occupies a significantly lower axial space than does the torque sensor in British specification 2 195 183.

When the electrode structures are formed by two meshing comb structures, an extremely low space requirement results, particularly in view of the required parallel connection of the individual electrode pairs. This structure is also relatively simple to manufacture. These advantages are even more significant if each comb structure is manufactured of one piece. A further advantage is achieved if the two comb structures are manufactured together of one piece, and are later mechanically and electrically separated from each other. The necessary mechanical and electrical separation can be undertaken after the application of the comb structures to the remainder of the sensor structure. The single piece with the two comb structures thereon may have a number of intentionally designed weak points, at which the single piece can be fractured after application to the remainder of the sensor structure to effect the separation.

Due to the especially simple manufacture and the high temperature stability of the sensor disclosed herein, a further advantage can be obtained by applying the electrode structures to an electrically insulating carrier layer consisting of temperature-stable material, such as PTFE.

The two electrodes of the measurement sensor disclosed herein can be formed by lithographically produced microstructures. Extremely small electrode spacings of the electrode pairs, in the micrometer range, having extremely large aspect ratios can be manufactured by x-ray deep lithography in combination with microgalvanoplastics. Details regarding these manufacturing techniques are described, for example, in the article "Herstllung von Mikrostrukturen mit grossem Aspektverhaeltnis und grosser Strukturhoehe durch Roentgentiefenlithografie mit Synchrotronstrahlung, Galvanoformung und Kunststoffabformung (LIGA-Verfahren)," Becker et al, KfK-Bericht 3995.

Given lithographically manufactured microstructures as the electrode structures, the variable electrode spacing of the electrode pairs may then exhibit an initial value of less than 10 micrometers. Measurement of length or spacing changes in the range of a few micrometers is thereby enabled.

To accommodate an optimum plurality of electrode pairs in a limited space, it is preferable that the electrodes have a thickness of a few hundred micrometers.

The electrodes preferably have a height of a few hundred micrometers, which is a relatively large structural height for a microstructure, but can be manufactured without problem by the aforementioned lithographic method. The relatively large height of the electrode means that each electrode has relatively large surfaces, thereby contributing to the sensitivity of the sensor by causing a relatively large change in capacitance for a given change of length between the measured points. To ensure that the overall capacitance of the capacitor arrangement is exclusively a function of the length or spacing change being measured, the capacitances formed between electrodes which are not allocated to each other in an electrode pair should be maintained low. This is achieved if the distance between neighboring electrodes which are not allocated to each other in a pair exhibits an initial value of a few hundred micrometers.

It is preferable that the electrodes of the electrode pairs overlap by a few millimeters, which results in electrode pairs having relatively large surfaces.

In general, the axial distance between the points on the shaft to be measured using the measuring arrangement disclosed herein amounts to at most one-half the diameter of the shaft, thereby permitting the measuring arrangement to have low space requirements.

In a preferred embodiment of the invention, two clamp rings are disposed side-by-side on the shaft to be measured, each ring having a projection which is in contact with a circle on the circumference of the shaft, extending around the shaft. The contact between the clamp rings and the shaft is thus described by a line, and the axial distance between the lines constitutes the distance to be measured. The torsion between these lines is transmitted to the electrode structures as relative motion between the two clamp rings. Preferably each clamp ring has a flattened exterior portion on which the electrode structure for that ring is applied in an electrically insulated fashion. This permits the electrode structures to be planar.

A further simplification in the assembly of the sensor arrangement is achieved in an embodiment including an elastic connection, extending in the axial direction, between the two clamp rings. The stiffness of the elastic connection is selected to be negligible in comparison to the stiffness of the shaft, so that the relative motion between the two clamp rings due to the torsion of the shaft is not impeded. The two clamp rings, thus connected, having the electrode structures already applied thereon can then be put in place on the shaft as a structural unit. The elastic connection may be in the form of a plurality of axially aligned pins extending between the two clamp rings.

The changes in capacitance appearing at the capacitor arrangement can be capacitively coupled in non-contacting fashion from the sensor arrangement on the rotating shaft. Further simplification of the structural outlay, however, is possible in an embodiment wherein inductive coupling of the changes in capacitance is undertaken. This inductive coupling is preferably accomplished by an axial ring coil arranged on the shaft.

As noted above, significant advantages of the measuring sensor disclosed herein are the extremely low axial space requirement, a high protection against overload, the possibility of re-equipping existing machines, and the extremely high precision and low response time which enables measurements to be made of oscillations. One possible disadvantage, however, is that transverse forces or bending moments acting on the shaft will cause a change in the spacing between the two measuring points on the shaft, and thus will also cause a change in the capacitance of the sensor arrangement. This means that the sensor arrangement would generate a total capacitance resulting from a superpositioning of the torque and the transverse force or the bending moment.

In order to eliminate the influence of transverse forces and bending moments acting on the shaft in the measured signal of the sensor arrangement, the sensor arrangement preferably includes a second capacitor arrangement, identical to the above-described capacitor arrangement, which is disposed at an angle of 180° (with reference to the axis of rotation of the shaft) relative to the first capacitor arrangement. The total measured capacitance is formed by a series circuit of the capacitance of the first capacitor arrangement and the capacitance of the second capacitor arrangement.

Transverse forces and bending moments cause a deformation of the shaft along the bending line. A displacement of the relative position of the two electrode structures of a capacitor arrangement results in a direction normal to the shaft axis. If this displacement proceeds parallel to the surfaces of the electrode pairs, it has no critical influence on the measured signal. If, however, the displacement proceeds perpendicularly relative to the surfaces of the electrode pairs, then a change in the measured torsional path and thus a change in the electrode spacing will result, causing a contribution to the measured output signal of the sensor arrangement which is not due to the torque acting on the shaft. The aforementioned second, identical capacitor arrangement, disposed at an angle of 180° relative to the first capacitor arrangement, compensates for this contribution to the measured signal. When a torque acts on the shaft, the electrode spacings of the two capacitor arrangements are enlarged by the same amount, and thus the respective overall capacitances of the two capacitor arrangements are also increased. Upon the introduction of a transverse force or a bending moment acting on the shaft, the electrode spacing of one of the capacitor arrangements is decreased as a result of the transverse force or bending moment, whereas the electrode spacing of the other capacitor arrangement is simultaneously increased by the same magnitude. By connecting the two capacitor arrangements in series, an exact compensation of the transverse force and being moment influences is achieved, but the measured capacitance due to torsion is not affected.

In a further embodiment of the invention, a further sensor arrangement identical to that described above, having capacitor arrangements disposed relative to each other by an angle of 180°, is provided on the shaft in addition to the aforementioned arrangement. The capacitor arrangements within each sensor arrangement are, as described above, connected in series, and the two sensor arrangements are connected in parallel. Again, exact compensation of the influence of transverse forces and bending moments on the shaft is achieved in each pair of capacitor arrangements due to their relative orientation by an angle of 180°.

In another embodiment of the invention, the two clamp rings which are disposed at a distance from each other on the shaft are elastically deformable, closed rings, and are part of a closed frame, which is shaped to receive the two capacitor arrangements, disposed at 180° relative to each other, between the clamp rings. When the shaft is not subjected to transverse forces or bending moments, the clamp rings will be parallel to each other. It is possible, however, that such transverse forces or bending moments may cause an angular change in the relative positions of the clamp rings, so that they are no longer parallel. In order to prevent this angular change from being transmitted to the parallel surfaces of the individual electrode pairs in the sensors, and thus causing an unwanted change in the overall capacitance, the capacitor arrangements are mounted in the aforementioned closed frame. This frame can be dimensioned so that parallel displacements in a tangential direction are still possible. Preferably the frame is rigidly attached to one clamp ring but is connected to the other clamp ring so as to be elastically rotatable to a slight extent. This can be accomplished by providing one or more weak points in the connection of the frame to that clamp ring.

DESCRIPTION OF THE PREFERRED EMBODIMENTS

Figure 1:
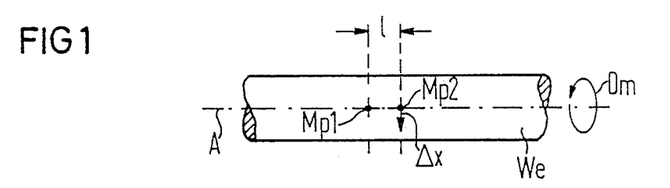
FIG. 1 is a side view of a shaft for which torsion is to be measured using a sensor arrangement constructed in accordance with the principles of the present invention as a measure of the torque acting on the shaft.

A rotating shaft, whose torque is to be measured in accordance with the principles of the present invention, is shown in FIG. 1 with points identified thereon for explaining the operation of the sensor arrangement. The shaft We is rotatable around an axis A, and has a circumferential surface with measuring points Mp1 and Mp2 identified thereon axially spaced from each other by a distance 1. When the shaft We transmits a torque, indicated by the arrow Dm, the shaft We experiences torsion between the measuring points Mp1 and Mp2, the torsion being proportional, and constituting a measure of, the torque Dm. The displacement of the measuring point Mp2 as a result of the torsion is indicated by $\Delta x$ occurring in the circumferential direction.

Figure 2:
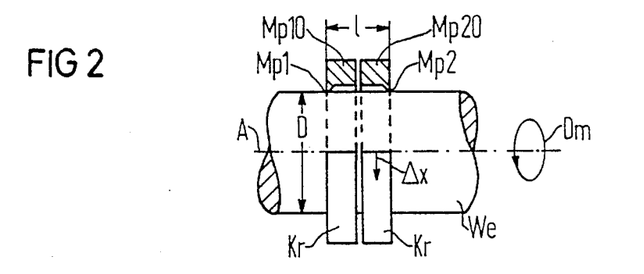
FIG. 2 is a schematic diagram, partly in section, of two clamp rings of a sensor arrangement constructed in accordance with the principles of the present invention spaced at a distance from each other on the shaft of FIG. 1.

As shown in FIG. 2, two clamp rings Kr of a sensor arrangement constructed in accordance with the principles of the present invention are mechanically coupled to the shaft We for measuring the distance change $\Delta x$. The mechanical coupling is achieved by projections from the inner surfaces of the clamp rings Kr, so that each ring contacts the surface of the shaft We on a line extending around the shaft We. The length change $\Delta x$ between the measuring points Mp1 and Mp2 can be measured as relative motion in the circumferential direction between the clamp rings Kr. Given the transmission of a torque Dm by the shaft We, measuring locations Mp10 and Mp20 on the respective clamp rings Kr will also be displaced relative to each other by the amount $\Delta x$.

Figure 3:
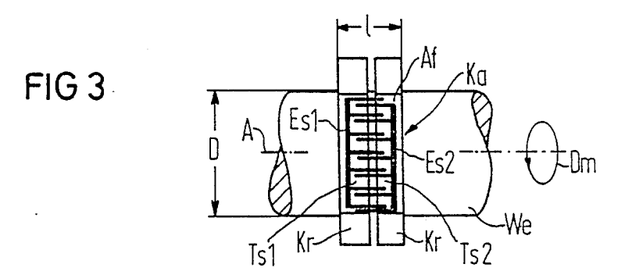
FIG. 3 is a plan view of a sensor arrangement constructed in accordance with the principles of the present invention mounted on the shaft of FIG. 1.
Figure 4:
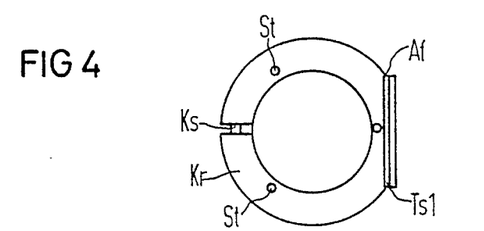
FIG. 4 is a side view of the sensor arrangement of FIG. 3 constructed in accordance with the principles of the present invention.

As shown in FIGS. 3 and 4, the two clamp rings Kr each have a flattened portion Kf, on which electrode structures Es1 and Es2 are respectively disposed. The electrode structures Es1 and Es2 in combination form a capacitor arrangement Ka. The two electrode structures Es1 and Es2 are in the form of meshing comb structures, and are disposed on respective electrically insulating carrier layers Ts1 and Ts2, consisting of temperature-stable material such as, for example, PTFE. As can be seen in FIG. 4, the two clamp rings Kr are elastically connected to each other by a plurality, such as three, axially extending pins St which are disposed at uniform distances around the circumference. This permits the rings Kr to be placed onto the shaft We as a structural unit together with the electrode structures Es1 and Es2 already applied thereto. A tight coupling of the rings Kr to the shaft We is accomplished by clamping screws Ks. The pins St have a stiffness which is negligible in comparison to the stiffness of the shaft We, so that the elastic connection of the clamp rings Kr does not falsify the measurement of the torsion.

Figure 5:
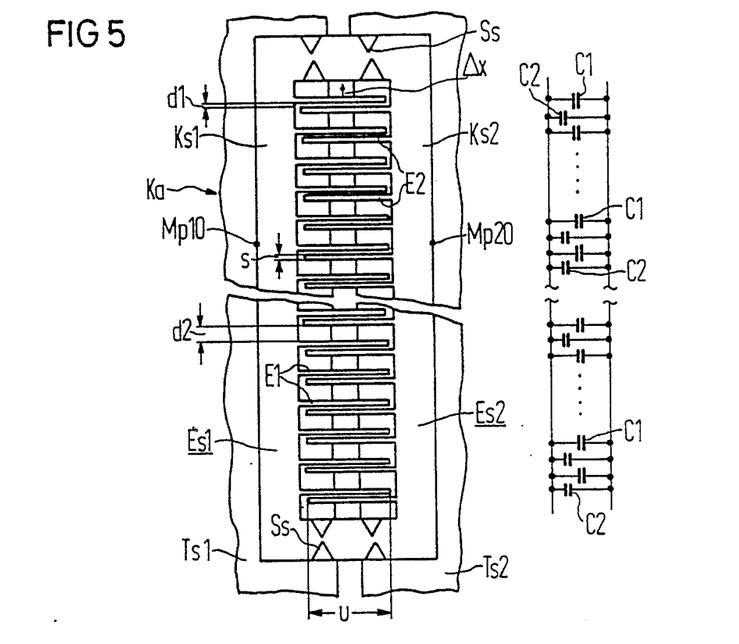
FIG. 5 is an enlarged plan view of portions of the electrode structures in the sensor arrangement constructed in accordance with the principles of the present invention, with a related circuit diagram.
Figure 6:
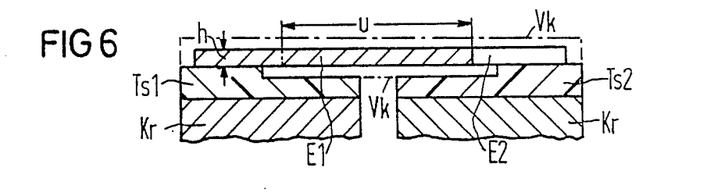
FIG. 6 is an enlarged cross-sectional view through the electrode structure of FIG. 5.

Enlarged views of the capacitor arrangement Ka are shown in FIGS. 5 and 6. As can be seen in FIG. 5, the electrode structure Es1 includes a comb web Ks1 and a plurality of electrodes E1 disposed parallel to and uniformly spaced from each other projecting perpendicularly from the comb web Ks1 along the axial direction of the sensor arrangement and the shaft We. The electrode structure Es1 is arranged on the carrier layer Ts1 so that the free ends of the individual electrodes E1 project beyond the edge of the clamp ring Kr. A second, identically fashioned electrode structure Es2 includes a comb web Ks2 and a plurality of electrodes E2 arranged in corresponding fashion on the carrier layer Ts2, so that the free ends of the individual electrodes E2 project beyond the edge of the clamp ring Kr, and are disposed in the spaces between the electrodes E1 of the other electrode structure Es1. The two meshing, comb-shaped electrode structures Es1 and Es2 are oriented highly asymmetrically relative to each other, so that a small spacing d1 is present. between the most closely disposed electrodes E1 and E2, thereby forming a plurality of electrode pairs. The spacing d1 is small in comparison to the spacing d2 between electrodes E1 and E2 on either side of an electrode pair, which do not form a part of that pair. Accordingly, the capacitances C2 formed across the spacings d2 are negligibly small in comparison to the capacitances C1 formed across the spacings d1 of the electrode pairs. As can be seen in the circuit diagram which is a part of FIG. 5, the overall capacitance of the capacitor arrangement Ka is formed by the parallel connection of the electrode pairs, and is substantially equal to the sum of the capacitances C1, the capacitances C2 providing a negligible contribution.

Due to the aforementioned relative movement of the measuring locations Mp10 and Mp20, the two electrode structures Es1 and Es2 arranged on the clamp rings Kr will also be dislocated parallel to each other by an amount $\Delta x$. The torsion, as measured by the distance change $\Delta x$, is converted into a capacitance change according to the relationship:

$$C = \frac{n \cdot \epsilon_0 \cdot F1}{d1 \pm \Delta x}$$

wherein is the number of electrodes E1 or E2, F1 is the area of the overlapping regions u (see FIG. 6) of the electrodes E1 and E2 of an electrode pair, d1 is the initial value of the spacing between the electrodes E1 and E2 of an electrode pair, and $\epsilon_0$ is the dielectric constant.

In order to achieve a sufficiently large measuring effect, the spacing d1 should not be significantly larger than the distance change $\Delta x$ due to torsion. For a shaft We of an electric motor having a diameter D=60 mm and an axial measuring distance 1=30 mm, the distance change due to torsion at nominal torque amounts will be approximately $\Delta x = 2\mu m$, so that a value of approximately $5\mu m$ is appropriate for the spacing d1. The area F1 of the overlapping region u of the electrodes E1 and E2 of an electrode pair, and the number n of electrode pairs, have a multiplicative effect. A large overlapping area F1, however, requires a relatively large height h (see FIG. 6) of the electrode structures Es1 and Es2. Due to the extremely small spacing d1, the electrode structures Es1 and Es2 in the micrometer range must have extremely large aspect ratios. Such structures can be produced by x-ray deep lithography in combination with microgalvanoplastics with nickel, for example, being suitable as the metal. Such structures may also consist of silicon, produced by a method known as silicon micromechanics, which is basically anisotropic etching of silicon.

Given a distance change $\Delta x$ in the range of 1–5 micrometers, the following exemplary structural dimensions are suitable:

| | |
|---|---|
| number of electrode pairs | n = 35 |
| spacing between electrodes E1 and E2 of an electrode pair | d1 = 5 μm |
| spacing between neighboring electrodes E1 and E2 that are not allocated to one another in a pair | d2 = 300 μm |
| height of an electrode E1 or E2 | n = 300 μm |
| width of an electrode E1 or E2 | s = 300 μm |
| length of the overlap of the electrodes E1 and E2 | u = 5 mm |

Given a shaft We having a diameter D=60 mm and an axial measuring distance l=30 mm, a capacitance change C of about 100 pf was capable of being achieved with the above structural dimensions, with the capacitance of the capacitor arrangement Ka being about 100pf without loading by a torque Dm, and rising to about 200pf at nominal torque. The change in the measured signal is thus approximately 100%, whereas a corresponding change in the measured signal in conventional devices such as wire strain gauges is only approximately 0.1%.

The electrode structures Es1 and Es2 are preferably manufactured as a single part, and are mechanically and electrically separated from each other after the clamp rings Kr have been connected to each other by the pins St. The separation of the electrode structures Es1 and Es2 occurs by a fracturing of weak points Ss as shown in FIG. 5, which are arranged in the region of the transverse connections between the comb webs Ks1 and Ks2.

The meshing of the electrodes E1 and E2 of the electrode structures Es1 and Es2 without deterioration of the sensitivity to small distance changes Δx is shown in FIG. 6. Friction-free adjustment is insured by a slight recess or step in each of the carrier layers Ts1 and Ts2 in registry with the overlap region of the electrodes E1 and E2. As indicated by dot-dash lines in FIG. 6, the arrangement including the electrodes E1 and E2 can be hermetically encapsulated by an encapsulation Vk. The encapsulation Vk prevents moisture and dust from reaching the electrodes E1 and E2, thereby preventing possible falsification of the measurement.

Figure 7:
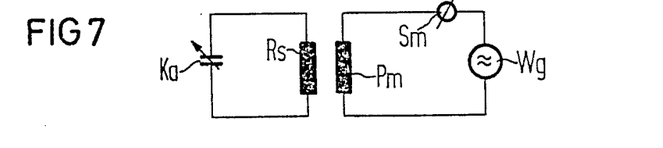
FIG. 7 is a circuit diagram showing inductive coupling of the capacitance changes out of the sensor arrangement constructed in accordance with the principles of the present invention.

A simplified schematic circuit diagram for inductively transmitting signals corresponding to the capacitance changes acquired with the measurement sensor of FIGS. 3 and 4 is shown in FIG. 7. The capacitor arrangement Ka is connected in parallel with an annular coil Rs, and the coil Rs is placed on the shaft We next to the clamp rings Kr. The parallel resonant circuit on the shaft We consisting of the capacitor arrangement Ka and the inductance of the coil Rs is brought to resonance by a rigidly mounted primary coil Pm. The magnitude of the capacitance Ka, and thus of the torque Dm, can thus be unambiguously derived from the resonant frequency. An ammeter Sm is connected in series with a primary coil Pm and with an alternating current generator WG to indicate the resonance.

The torque transmitted by the shaft We, and thus the mechanical power as well, can be measured with a high precision of less than ±1% in a temperature range from −40° C. through 200° C. with the measurement sensor described above. In addition to an extremely small space requirement in comparison to known measurement sensor, the sensor disclosed herein has low manufacturing costs. The sensor can be easily modified to undertake measurements of structures other than shafts.

FIGS. 8-17 show various embodiments of measurement sensors constructed in accordance with the principles of the present invention wherein the influence of transverse forces and bending moments acting on the shaft are compensated.

As described earlier, transverse forces and bending moments cause a deformation of the shaft along a bending line. A displacement of the relative position of the two clamp rings which are used to measure the torsion of the shaft results, in a direction normal to the axis of the shaft.

Figure 8:
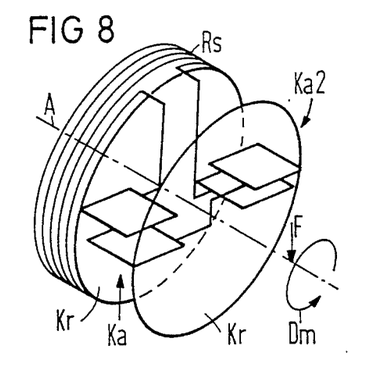
FIGS. 8 and 9 are schematic diagrams in perspective of a sensor arrangement constructed in accordance with the principles of the present invention for explaining the exact compensation of transverse forces or bending moments acting on the shaft.

A schematic illustration for explaining how the influence of such transverse forces and bending moments is compensated in a sensor constructed in accordance with the principles of the present invention is shown in FIG. 8. The sensor in FIG. 8 has a capacitor arrangement as described above including electrodes (not shown in detail) are attached to a clamp ring Kr. Given the introduction of a transverse force F proceeding perpendicularly to the electrode surfaces of the capacitor arrangement Ka (or a corresponding bending moment), a significant change in the electrode spacing, and thus a change in the overall capacitance of the capacitor arrangement Ka, results. To compensate for this change, a second, identical capacitor arrangement Aa2 is arranged at an angle of 180° relative to the capacitor arrangement Ka, with reference to the axis A. The second capacitor arrangement Ka2 is the same structure as would be obtained if the capacitor arrangement Ka were rotated through 180° around the axis A. The capacitance of the capacitor arrangement Ka and the capacitance of the second capacitor arrangement Ka2 are connected in series, and together form a measuring capacitance which is connected in series with the coil Rs. When a torque Dm acts on the shaft We, the respective electrode spacings and the respective overall capacitances of both capacitor arrangements Ka and Ka2 enlarge to the same extent. Upon the introduction of a transverse force F (or a corresponding bending moment) as shown in FIG. 8, the electrode spacing of the capacitor arrangement Ka increases, but the electrode spacing of the second capacitor arrangement Ka2 decreases by the same magnitude. Due to the series connection of the capacitor arrangements Ka and Ka2, an exact compensation results, i.e., the measuring capacitance formed by the series circuit is unchanged due to the influence of the transverse force F.

Figure 9:
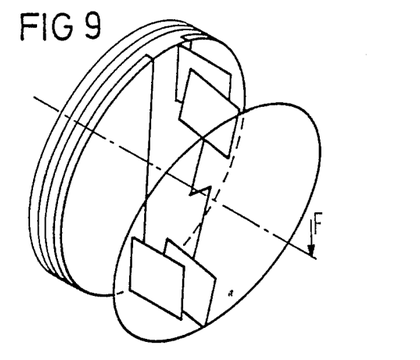

The influence of a transverse force F on a sensor arrangement constructed in accordance with the principles of the present invention, which has been rotated by 90° relative to the position shown in FIG. 8, is shown in FIG. 9. In this position, the transverse force F causes a displacement (shown greatly exaggerated) parallel to the electrode surfaces of the capacitor arrangements Ka and Ka2. Because the areas of the capacitances are only minimally reduced, with the change in area being less than 0.1, no noticeable or degrading influence on the measuring capacitance results.

Figure 10:
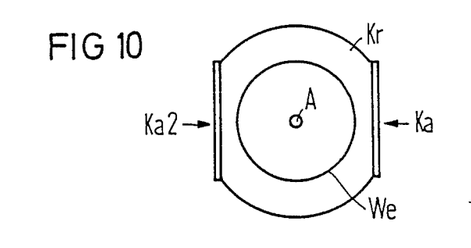
FIG. 10 is a side view of a sensor arrangement constructed in accordance with the principles of the present invention with two capacitor arrangements for compensating for the effect of transverse forces or bending moments acting on the shaft.
Figure 11:
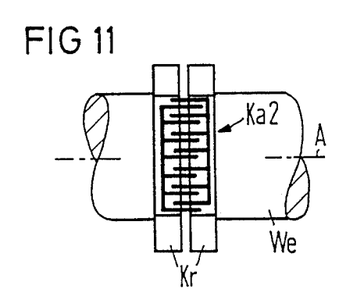
FIGS. 11 and 12 are plan views of the two capacitor arrangements disposed relative to each other by an angle of 180° on a shaft for measuring the torque acting on the shaft.
Figure 12:
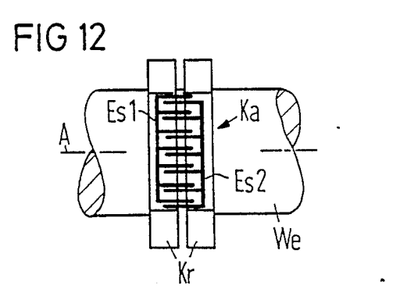

FIGS. 10 through 12 show a structure for implementing the principle described in connection with FIG. 8. A measuring sensor is shown in FIG. 10 having the capacitor arrangement Ka mounted on clamp rings Kr (only one of which can be seen in FIG. 10) in a manner as shown in FIG. 4, and the second, identical capacitor arrangement Ka2 is disposed at the opposite side of the rings Kr, at an angle of 180° with respect to the capacitor arrangement Ka, with reference to the axis A of the shaft We.

A plan view of the second capacitor arrangement Ka2 is shown in FIG. 11, and FIG. 12 shows a plan view of the capacitor arrangement Ka.

Figure 13:
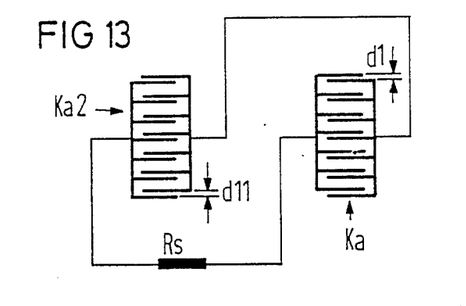
FIG. 13 is a circuit diagram showing the electrical connection of the two capacitor arrangements in the sensor arrangement of FIGS. 8 through 12.

A circuit diagram for the capacitor arrangements Ka2 and Ka shown in FIGS. 11 and 12 is shown in FIG. 13. As can be seen in FIG. 13, the capacitor arrangements Ka2 and Ka are connected in series, and the measuring capacitance resulting from this series connection is connected in parallel with the annular coil Rs described in connection with FIGS. 7, 8 and 9. The electrode spacing of the capacitor arrangement Ka is referenced dl (as in FIG. 5), and the electrode spacing of the capacitor arrangement Ka is referenced dll. Following from the principle described in connection with FIG. 8 and from the geometric conditions of the attachment of the capacitor arrangements Ka and Ka2 according to FIGS. 10-12, an enlargement of the electrode spacing dl by an amount $\Delta d$ will cause a decrease in the electrode spacing dll by the same amount $\Delta d$, and vice-versa.

Figure 14:
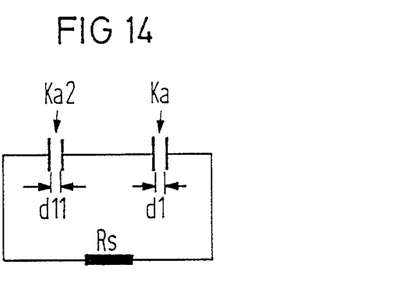
FIG. 14 is an equivalent circuit diagram for the series circuit of FIG. 13.

FIG. 14 is an equivalent circuit for the circuit shown in FIG. 13, with the total measuring capacitance C being derived according to the following relationship:

$$C = \epsilon_0 \cdot \epsilon_r \frac{F1}{(d11 + \Delta d) + (d1 - \Delta d)}$$

wherein $\epsilon_0$ is the absolute dielectric constant, $\epsilon_r$ is the relative dielectric constant and F1 is the area of the overlapping regions of the electrodes. As can be seen from this relationship, spacing changes produced by transverse forces or bending moments are completely compensated or cancelled.

Figure 15:
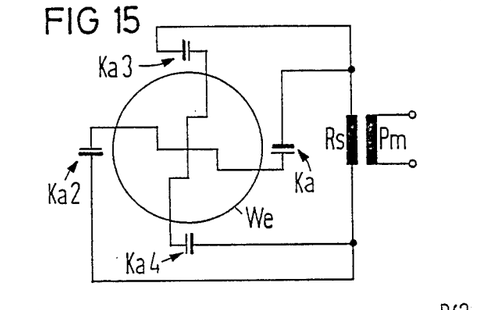
FIG. 15 is a schematic circuit diagram showing a further embodiment of a sensor arrangement constructed in accordance with the principles of the present invention having four capacitor arrangements arranged in two pairs.

A circuit diagram for a further embodiment of a measuring sensor constructed in accordance with the principles of the present invention, using the principles described in connection with FIG. 8, is shown in FIG. 15. This arrangement consists of two pairs of capacitor arrangements, with each pair being arranged as described in connection with FIG. 8. As previously described, the capacitor arrangements Ka and Ka2 are arranged 180° relative to each other and are connected in series, with the total series capacitance being connected in parallel to the annular coil Rs. Two further, identical capacitor arrangements Ka3 and Ka4 are also arranged relative to each other by an angle of 180°, and are disposed at angles of 90° relative to the arrangements Ka and Ka2. The capacitor arrangements Ka3 and Ka4 are also connected in series, with the total measuring capacitance resulting from this series connection also connected in parallel with the annular coil Rs. Each pair of capacitor arrangements is mounted on a pair of rings Kr as shown in FIG. 10, with the rings being rotated by 90° relative to each other when placed on the shaft We, with appropriate electrical connections to the coil Rs. The transmission of the measured values in this arrangement again ensues via the annular coil Rs arranged on the shaft We, forming a parallel resonant circuit with the capacitances formed by the four capacitor arrangements. This resonant circuit is again inductively placed in resonance by a stationary primary coil Pm, and the torque acting on the shaft We is identified by the resonant frequency.

Figure 16:
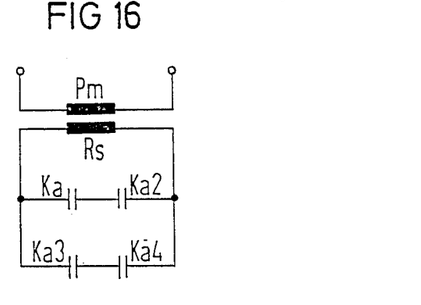
FIG. 16 is an equivalent circuit diagram for the circuit of FIG. 15.

The equivalent circuit diagram of the arrangement shown in FIG. 15 is shown in FIG. 16. As can be seen in FIG. 16, the series connection of the capacitances Ka and Ka2 is connected in parallel with the coil Rs, as is the series connection of the capacitances Ka3 and Ka4.

Figure 17:
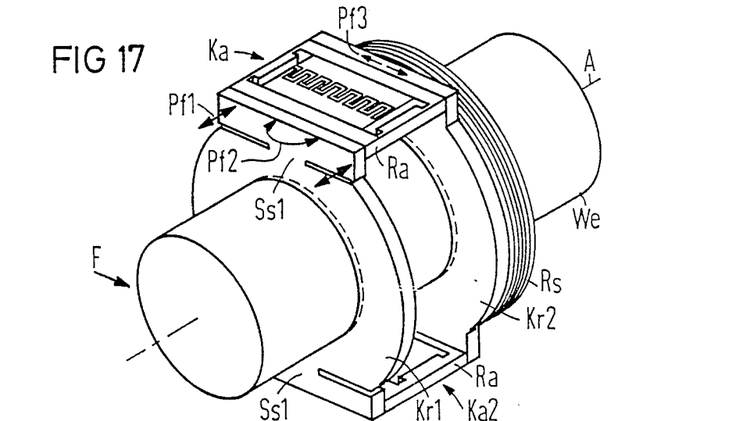
FIG. 17 is a perspective view of a sensor arrangement constructed in accordance with the principles of the present invention, and mounted on a shaft whose torque is to be measured, in the embodiment having two capacitor arrangements for compensating for transverse forces and bending moments acting on the shaft, and having an elastic, closed frame.

A structural embodiment of a measurement sensor constructed in accordance with the principles of the present invention having two identical capacitor arrangements Ka and Ka2 disposed at an angle of 180° relative to each other is shown in a perspective view in FIG. 17. The two clamp rings on the shaft We at an axial spacing from each other are referenced Kr1 and Kr2. The annular coil Rs is disposed on the shaft We immediately behind the clamp ring Kr2.

In addition to the aforementioned displacement of the two clamp rings Kr1 and Kr2 relative to each other, a transverse force F acting on the shaft We also causes and angular change between the normally parallel clamp rings Kr1 and Kr2 along the bending line. In order that these angular changes do not transfer onto the parallel electrode surfaces of the capacitor arrangements Ka and Ka2, and thus cause an unwanted change in capacitance, each of the capacitor arrangements Ka and Ka2 is mounted in a closed frame Ra. The frames Ra are dimensioned so that parallel displacements in the tangential direction are still possible. The frames Ra are rigidly connected to one of the clamp rings, such as the clamp ring Kr2, and are connected to the other clamp ring, such as the clamp ring Kr1, in a manner which permits slight rotation to ensure that a parallel arrangement of the electrodes of the capacitor arrangements Ka and Ka2 is preserved, even in the presence of transverse forces F or bending moments. The slight rotation in this connection is created by a weak point Ss1 at the clamp ring Kr1, formed by slots (not shown in detail) introduced into the clamp ring Kr1 parallel to the frame Ra. The various motion possibilities of the illustrated frame arrangement are indicated by the arrows Pf1, Pf2 and Pf3.

Although modifications and changes may be suggested by those skilled in the art it is the intention of the inventors to embody within the patent warranted hereon all changes and modifications as reasonably and properly come within the scope of their contribution to the art.

We claim as our invention:

1. An arrangement for measuring the torque acting on a rotating shaft comprising:

a capacitor arrangement formed by first and second electrode structures, each electrode structure having a plurality of parallel, spaced electrodes;

first and second means adapted for respectively mechanically coupling said first and second electrode structures to respective points axially spaced a first distance from each other on a shaft whose torque is to be measured, said first distance between said points changing due to torsion of said shaft in an amount proportional to the torque acting on said shaft and said first and second means for coupling being moveable relative to each other due to said torsion;

means for asymmetrically mounting said first and second electrode structures on said first and second means for coupling insulated from each other in a common plane with said electrodes of said first and second electrode structures forming electrode pairs parallel to each other, with the electrodes of each electrode pair being spaced a second distance from each other approximating the change in said first distance between said measuring points due to torsion of said shaft and the spacing between the electrodes in each electrode pair changing in an amount corresponding to said relative movement of said first and second means for coupling due to said torsion, each electrode pair forming a capacitor having a capacitance which changes as the spacing between the electrodes of the pair changes, and with neighboring electrodes on either side of each electrode pair being spaced a third distance from said electrode pair which is large in comparison to said change in said first distance due to torsion of said shaft; and means for electrically connecting said capacitors formed by said electrode pairs in parallel to obtain a total capacitance change which is the sum of the capacitance change of each of said electrode pairs and which is a measure of the torque acting on said shaft.

2. An arrangement as claimed in claim 1, wherein each of said first and second electrode structures is a comb structure, and wherein said means for asymmetrically mounting said first and second electrode structures is a means for asymmetrically mounting said first and second electrode structures so that said comb structures mesh.

3. An arrangement as claimed in claim 2, wherein each of said comb structures comprises a one piece structure.

4. An arrangement as claimed in claim 2, wherein said comb structures are simultaneously manufactured on a single piece, and wherein said arrangement further comprises fracture means in said single piece for separating said first and second electrode structures after mounting on said first and second means for coupling.

5. An arrangement as claimed in claim 4, wherein said fracture means comprises a plurality of structural weak points in said single piece.

6. An arrangement as claimed in claim 1, wherein said means for asymmetrically mounting said first and second electrode structures on said first and second means for coupling includes an electrically insulating carrier layer disposed between said first and second electrode structures and said first and second means for coupling and consisting of temperature-stable material.

7. An arrangement as claimed in claim 6, wherein said carrier layer consists of PTFE.

8. An arrangement as claimed in claim 1, wherein each of said first and second electrode structures is a lithographically produced microstructure.

9. An arrangement as claimed in claim 1, wherein said means for asymmetrically mounting said first and second electrode structures on said first and second means for coupling is a means for asymmetrically mounting said first and second electrode structures with said second distance being less than 10 mm when no torque is acting on said shaft.

10. An arrangement as claimed in claim 9, wherein said means for asymmetrically mounting said first and second electrode structures on said first and second means for coupling is a means for asymmetrically mounting said first and second electrode structures so that said second distance changes within a range of a few micrometers due to torsion of said shaft.

11. An arrangement as claimed in claim 1, wherein said electrodes of said first and second electrode structures have a height of a few hundred micrometers.

12. An arrangement as claimed in claim 1, wherein each of said electrodes of said first and second electrode structures has a width of a few hundred micrometers.

13. An arrangement as claimed in claim 1, wherein said means for asymmetrically mounting said first and second electrode structures on said first and second means for coupling is a means for asymmetrically mounting said first and second electrode structures so that said third distance is in the range of a few hundred micrometers.

14. An arrangement as claimed in claim 1, wherein said means for asymmetrically mounting said first and second electrode structures on said first and second means for coupling is a means for asymmetrically mounting said first and second electrode structures so that said electrodes in said electrode pairs overlap each other in said plane by a few millimeters.

15. An arrangement as claimed in claim 1, wherein said first and second means for coupling are first and second means adapted for respectively mechanically coupling said first and second electrode structures to respective points on said shaft so that said first distance is at most one-half the diameter of said shaft.

16. An arrangement as claimed in claim 1, wherein said first and second means for coupling are first and second clamp rings circumferentially surrounding said shaft axially spaced at said first distance from each other.

17. An arrangement as claimed in claim 16, wherein said means for asymmetrically mounting includes a flattened surface on each of said clamp rings on which said first and second electrode structures are respectively asymmetrically mounted.

18. An arrangement as claimed in claim 16, further comprising means for elastically connecting said first and second clamp rings, said means for elastically connecting having a stiffness which is negligible in comparison to the stiffness of said shaft.

19. An arrangement as claimed in claim 18, wherein said means for elastically connecting comprises a plurality of axially disposed pins extending between said first and second clamp rings.

20. An arrangement as claimed in claim 1, further comprising means for inductively transmitting a signal corresponding to said total capacitance change from said arrangement.

21. An arrangement as claimed in claim 20, wherein said means for inductively transmitting is an annular coil disposed on said shaft and electrically connected to said means for electrically connecting said capacitors.

22. An arrangement as claimed in claim 1, further comprising:

a further arrangement formed by second and third electrode structures identical to said first and second electrode structures;

said first and second means for coupling also being means for respectively coupling said third and fourth electrode structures to said respective points on said shaft identically to said first and second electrode structures;

means for asymmetrically mounting said second and third electrode structures on said first and second means for coupling identically to said first and second electrode structures but with said third and fourth electrode structures being disposed on said means for coupling at an angle of 180° relative to said first and second electrode structures, with reference to the axis of rotation of said shaft;

means for electrically connecting the capacitors formed by the electrode pairs of said third and fourth electrode structures in parallel to obtain an additional total capacitance change which is the sum of the capacitance change of each of said electrode pairs of said third and fourth electrode structures and which is measure of the torque acting on said shaft; and series means for electrically connecting said means for electrically connecting the capacitors formed by said electrode pairs of said first and second electrode structures in series with said means for electrically connecting the capacitors formed by the electrode pair of said third and fourth electrode structures.

23. An arrangement as claimed in claim 22, further comprising a further arrangement for measuring the torque acting on a rotating shaft identical to said arrangement for measuring the torque acting on said rotating shaft and disposed on said shaft and further comprising means connecting each of said series means in parallel for obtaining an overall capacitance change which is a measure of the torque acting on said shaft.

24. An arrangement as claimed in claim 23, wherein said further arrangement is disposed on said shaft rotated by an angle of 90° relative to said arrangement.

25. An arrangement as claimed in claim 1, wherein said first and second means for coupling are first and second clamp rings circumferentially surrounding said shaft, and said arrangement further comprising an elastically deformable closed frame receiving said capacitor arrangement and disposed between and connected to said first and second clamp rings.

26. An arrangement as claimed in claim 25, wherein said frame is rigidly attached to said first clamp ring and further comprising means for attaching said frame to said second clamp ring for permitting slight elastic rotatation of said second clamp ring relative to said frame.

27. An arrangement as claimed in claim 26, wherein said means for attaching is a structural weak point between said frame and said second clamp ring.

28. An arrangement for measuring the torque acting on a rotating shaft comprising:

first and second torsion-responsive means adapted for mechanical coupling to a shaft whose torque is to measured at respective points axially spaced on said shaft for moving relative to each other due to torsion of said shaft in an amount proportional to the torque acting on said shaft; and first and second electrode structures respectively comovably attached to said first and second torsion-responsive means, each electrode structure having a plurality of parallel, spaced electrodes and said first and second electrode structures being disposed in a common plane insulated from each other so that a plurality of electrode pairs are formed, each electrode pair consisting of an electrode of said first electrode structure and an electrode of said second electrode structure closest thereto, each electrode pair forming a capacitor having a spacing between the electrodes in said pair which changes due to said torsion thereby changing the capacitance of the capacitor formed by the electrode pair, all electrodes in each electrode structure being connected so that said capacitors formed by said electrode pairs are connected in parallel thereby generating a total capacitance change which is the sum of the capacitance change of each of said capacitors and which is a measure of the torque acting on said shaft.

29. An arrangement as claimed in claim 28, wherein the axial distance between said first and second torsion-responsive means changes by an amount due to torsion of said shaft caused by said torque acting on said shaft, and wherein the spacing between the electrodes in each electrode pair, when no torque is acting on said shaft, approximates said change in said axial distance between said first and second torsion-responsive means.

30. An arrangement as claimed in claim 29, wherein each electrode pair has neighboring electrodes on either side thereof, and wherein the distance between said electrode pair and each neighboring electrode is large in comparison to said spacing between the electrodes in the electrode pair, so that each electrode pair is capacitively decoupled from every other electrode pair.

31. An arrangement as claimed in claim 28, further comprising:

means for inductively transmitting a signal corresponding to said total capacitance change from said arrangement.

32. An arrangement for measuring the torque acting on a rotating shaft comprising:

first and second torsion-responsive means adapted for mechanical coupling to a shaft whose torque is to be measured at respective points axially spaced on said shaft for moving relative to each other due to torsion of said shaft in an amount proportional to the torque acting on said shaft;

a first capacitor arrangement formed by first and second electrode structures respectively co-movably attached to said first and second torsion responsive means, each of said first and second electrode structures having a plurality of parallel, spaced electrodes and said first and second electrode structures being disposed in a first common plane insulated from each other so that a first plurality of electrode pairs are formed, each electrode pair in said first plurality of electrode pairs consisting of an electrode of said first electrode structure and an electrode of said second electrode structure closest thereto, each electrode pair in said first plurality of electrode pairs forming a capacitor having a spacing between the electrodes in said pair which changes due to said torsion thereby changing the capacitance of the capacitor formed by the electrode pair, all electrodes in each of said first and second electrode structures being respectively connected so that said capacitors formed by said first plurality of electrode pairs are connected in parallel thereby generating a first total capacitance change which is the sum of the capacitance change of each of said capacitors formed by said first plurality of electrode pairs and which is a measure of the torque acting on said shaft;

a second capacitor arrangement formed by third and fourth electrode structures respectively co-movably attached to said first and second torsion-responsive means, each of said third and fourth electrode structures having a plurality of parallel, spaced electrodes, and said third and fourth electrode structures being disposed in a second common plane, oriented at an angle of 180° relative to said first common plane, with respect to an axis of rotation of said shaft, insulated from each other so that a second plurality of electrode pairs are formed, each electrode pair in said second plurality of electrode pairs consisting of an electrode of said third electrode structure and an electrode of said fourth electrode structure closest thereto, each electrode pair in said second plurality of electrode pairs forming a capacitor having a spacing between the electrodes in said pair which changes due to said torsion thereby changing the capacitance of the capacitor formed by the electrode pair, all electrodes in each of said third and fourth electrode structures being connected so that said capacitors formed by said second plurality of electrode pairs are connected in parallel thereby generating a second total capacitance change which is the sum of the capacitance change of each of said capacitors formed by said second plurality of electrode pairs and which is a measure of the torque acting on said shaft; and means connecting said first and second capacitor arrangements in parallel thereby generating an overall capacitance change which is the sum of said first and second total capacitance changes and which is a measure of torque acting on said shaft.

33. An arrangement as claimed in claim 32, wherein the axial distance between said first and second torsion-responsive means changes by an amount due to torsion of said shaft caused by said torque acting on said shaft, and wherein the spacing between the electrodes in each electrode pair, when no torque is acting on said shaft, approximates said change in said axial distance between said first and second torsion-responsive means.

34. An arrangement as claimed in claim 33, wherein each electrode pair has neighboring electrodes on either side thereof, and wherein the distance between said electrode pair and each neighboring electrode is large in comparison to said spacing between the electrodes in the electrode pair, so that each electrode pair is capacitively decoupled from every other electrode pair.

35. An arrangement as claimed in claim 32, further comprising:
   means for inductively transmitting a signal corresponding to said total capacitance change from said arrangement.

36. An arrangement as claimed in claim 32, further comprising:
   a first elastically deformable closed frame receiving said first capacitor arrangement and disposed between said first and second torsion responsive means and being rigidly connected to said first torsion responsive means;
   means for attaching said second frame to said second torsion-responsive means for permitting slight elastic rotation of said second torsion-responsive means relative to said first frame;
   a second elastically deformable closed frame receiving said second capacitor arrangement and disposed between said first and second torsion-responsive means; and
   means for attaching said second frame to said second torsion-responsive means for permitting slight elastic rotation of said second torsion-responsive means relative to said second frame.

* * * * *